(12) United States Patent
LeFevre

(10) Patent No.: US 9,298,566 B2
(45) Date of Patent: Mar. 29, 2016

(54) AUTOMATIC CLUSTER-BASED FAILOVER HANDLING

(71) Applicant: Hewlett-Packard Development Company, L.P., Houston, TX (US)

(72) Inventor: Marc Edward LeFevre, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 211 days.

(21) Appl. No.: 13/864,673

(22) Filed: Apr. 17, 2013

(65) Prior Publication Data

US 2014/0317437 A1   Oct. 23, 2014

(51) Int. Cl.
*G06F 11/00* (2006.01)
*G06F 11/20* (2006.01)

(52) U.S. Cl.
CPC ........ *G06F 11/2033* (2013.01); *G06F 11/2035* (2013.01); *G06F 11/2043* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,496,740 | B1* | 12/2002 | Robertson | G06F 15/17 700/11 |
| 7,016,299 | B2* | 3/2006 | Kashyap | 370/218 |
| 7,360,010 | B2 | 4/2008 | Ghaffari et al. | |
| 7,778,157 | B1* | 8/2010 | Tawri et al. | 370/216 |
| 7,778,488 | B2* | 8/2010 | Nord | G06T 7/0028 382/128 |
| 7,984,258 | B2 | 7/2011 | Sicola | |
| 8,028,193 | B2 | 9/2011 | Dake et al. | |
| 8,873,398 | B2* | 10/2014 | Kempf | 370/216 |
| 8,909,980 | B1* | 12/2014 | Lewis | G06F 11/00 714/4.11 |
| 8,949,656 | B1* | 2/2015 | Ninan | G06F 11/2005 714/4.1 |
| 9,100,329 | B1* | 8/2015 | Jiang | H04L 45/28 |
| 2004/0049573 | A1* | 3/2004 | Olmstead | G06F 11/2028 709/224 |
| 2006/0090094 | A1* | 4/2006 | McDonnell | G06F 11/2007 714/5.11 |
| 2006/0171303 | A1* | 8/2006 | Kashyap | H04L 45/586 370/228 |
| 2011/0317700 | A1* | 12/2011 | Assarpour | H04L 12/4625 370/392 |
| 2012/0324137 | A1 | 12/2012 | Jinno et al. | |
| 2015/0269039 | A1* | 9/2015 | Akirav | G06F 11/2007 714/4.11 |

OTHER PUBLICATIONS

Gibbons, T. et al., "Switched SAS Sharable, Scalable SAS Infrastructure," White Paper, Oct. 2010.
Alvin Cox, "Information technology—Serial Attached SCSI—3 (SAS-3)", Seagate Technology, 291pp., Apr. 23, 2012.
Barry Olawsky et al., SFF Committee, SFF Committee SFF-8449 Specification for Shielded Cables Management Interface for SAS,ftp://ftp.seagate.com/sff, 16pp., accessed Nov. 19, 2015.
George Penokie, "Information technology—SAS Protocol Layer—2 (SPL-2)", LSI Corporation, 830pp., May 10, 2012.
Harry Mason, "Advanced Connectivity Solutions Unleash SAS Potential", SCSI Trade Association White Paper, 18pp., Oct. 2009.
SFF Committee, "SFF Committee SFF-8636 Specification for Management Interface for Cabled Environments", ftp://ftp.seagate.com/sff, 60 pp., accessed Nov. 19, 2015.
SFF Committee, "SFF-8644 Specification for Mini Multilane 4/8X 12 Gb/s Shielded Cage/Connector (HD 12sh)", ftp://ftp.seagate.com/sff, 7pp., accessed Nov. 19, 2015.

* cited by examiner

*Primary Examiner* — Amine Riad
(74) *Attorney, Agent, or Firm* — Hewlett Packard Enterprise Patent Department

(57) ABSTRACT

Example embodiments relate to automatic cluster-based failover handling. In example embodiments, a first node included in a high availability cluster may receive a failure signal from a second node included in the high availability cluster, where the failure signal indicates a failure in the second node. The failure signal may also indicate a second port in the second node that is or will be inactive due to the failure, the second port being associated with a second port address. The first node may activate a first port of the first node, where the first port was previously inactive before being activated. The first node may assign a first port address to the first port, wherein the first port address is the same as the second port address.

14 Claims, 4 Drawing Sheets

AUTOMATIC CLUSTER-BASED FAILOVER HANDLING

BACKGROUND

High-availability (HA) clusters (also known as failover clusters) are groups of computers and/or computer components that support server applications and/or provide storage that can be reliably utilized with minimum down-time. HA clusters may include and utilize redundant computers and/or redundant components that provide continued (i.e., uninterrupted) service when computers and/or components fail. Without clustering, if a computer or component crashes, the application or storage provided by that computer or component will be unavailable until the crashed computer or component is fixed. The term "port failover" (or simply, "failover") or "multipathing" may refer to the switching from a failing computer/component to a redundant or standby computer/component upon the failure or abnormal termination of the previously active computer/component. Additionally, redundant computers/components may result in increased bandwidth as experienced by host computing devices that connect to the HA cluster.

Small Computer System Interface (SCSI) is a set of standards for physically connecting and transferring data between computers and peripheral devices. The SCSI standards define commands, protocols and electrical and optical interfaces. SCSI is most commonly used for hard disks and tape drives, but it can connect a wide range of other devices, including scanners and CD drives. Serial Attached SCSI (SAS) is a serial communication protocol that is used to move data to and from computers and peripherals, for example, storage devices such as hard drives and tape drives. SAS was designed to replace the older parallel SCSI bus technology. SAS, like parallel SCSI, uses the standard SCSI command set.

BRIEF DESCRIPTION OF THE DRAWINGS

The following detailed description references the drawings, wherein.

DETAILED DESCRIPTION

Figure 1:
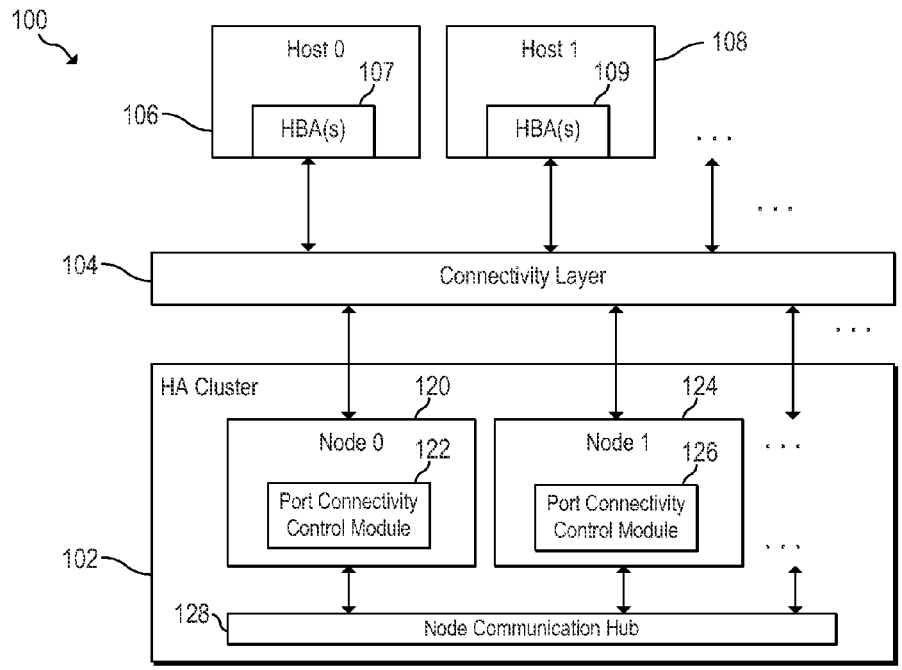
FIG. 1 is a block diagram of an example HA cluster configuration that may implement automatic cluster-based failover handling.

As described above, various high-availability (HA) clusters (e.g., storage clusters) may include and utilize redundant computers and/or redundant components that provide continued (i.e., uninterrupted) service when computers and/or components fail. At least one host computing device may connect to a HA cluster, for example, to store data to the cluster and/or retrieve data from the cluster. In various configurations, such a host computing device may need to be able to recognize the redundant computers or components in the cluster so that when a failover occurs, the host device can switch its connection (e.g., where it routes requests to/from) from the failing computer/component to the redundant or standby computer/component. In these configurations, host devices may use software, drivers or the like to recognize redundant computers/components, detect a failover, and manage the switching of connections to standby computers/components. This software (or drivers, etc.) may be referred to as "failover software" or "multipathing software".

In various scenarios, failover software may be problematic. Failover software may experience high failure rates and/or may not provide a seamless failover solution. Additionally, failover software may be slow to detect failures and slow to perform failover actions (e.g., switch to redundant computers or components). One example reason why failover software may experience these problems is because various types of failover software may infer failures based on data that is distant from the actual failure. As a specific example, when a storage server fails, the storage server becomes aware very quickly (e.g., immediately) that itself has failed. On the other hand, in order for failover software in a host device to determine that a storage server has failed, the failover software may have to analyze data received from the storage server (or the lack of expected data). This data may not be available immediately, and the data may be ambiguous (e.g., may not indicate a failure for certain). As another example of a problem associated with host-based failover solutions, there is no standard manner for dealing with failovers in a host. Therefore, an administrator of a host may need to expend extra time and resources determining the most appropriate way to deal with failovers.

Various HA cluster configurations may utilize fibre channel (FC) to implement communication links between the computers/components of the HA cluster and computers and/or components that connect to the cluster (e.g., host computing devices and/or switching/expansion components). These configurations may implement a failover solution called "NPortID Virtualization" (NPIV), which may eliminate the need for a host-based software failover solution. However, NPIV is limited to fibre channel configurations, and may not be used for configurations that utilize other types of communication links or protocols (e.g., SCSI, SAS and the like). These other types of communication protocols facilitate communication in a manner that is much different than fibre channel. For example, fibre channel communication links may rely on a database of entities that are connected to the FC network. Other communication protocols (e.g., SAS) may not utilize such a database. Various differences between fibre channel communications and other communication protocols may make NPIV unworkable for configurations that utilize these other communication protocols.

Various HA cluster configurations may utilize a connectivity layer that connects a HA cluster to at least one host device. The connectivity layer may include one or more components (e.g., switches, expanders, etc.). Various configurations may implement a failover solution in such a connectivity layer. These solutions may require the communication of one or more virtual port addresses to the host devices, and the host devices may be required to use these virtual port addresses. The failover solution in the connectivity layer may then change (upon a failover) which port address is associated with the virtual port address used by the host. Even if such solutions were implemented entirely in the connectivity layer, there may still be drawbacks. For example, existing connectivity layer infrastructure in server centers would have to be updated to use new components. It may be the case that a HA cluster administrator may desire to implement a cluster-based failover solution, but may be unable to update the connectivity layer (e.g., for cost reasons or because no company has created such connectivity components yet).

The present disclosure describes automatic cluster-based failover handling. The present disclosure describes a solution that may not require a host to implement a failover software solution. However, it should be understood that the solution of the present disclosure may still be used with a host configured to use failover software. The present disclosure describes a solution that may work with various non-fibre channel communication links/protocols (e.g., SAS, SCSI, etc.). The present disclosure describes a solution that may not require any changes to a connectivity layer (e.g., switches, expanders, etc.) that connects a HA cluster to at least one host device. In this respect, an administrator of a HA cluster may implement a cluster-based failover solution without changing the connectivity layer. The solution described herein provides low-latency failover handling (with minimal disruption to host devices), for example, by activating reserved ports on a non-failing node with sub-second timing.

Throughout this disclosure, it should be understood that the term "host" or "host device" may be used as a shorthand term or a more generalized term for "host computing device." Likewise, the term "node" or "node device" may be used as a shorthand term or a more generalized term for "node computing device." Throughout this disclosure, the term "failure" or "failed" or "failover," as the terms pertain to the failure of computers and/or components of an HA cluster, may be used to refer to an event that may initiate the use of at least one redundant computer/component of the HA cluster. For example, if one node computing device fails, another node computing device may provide access to the same services that the failing node provided. A failure of a computer or node may be one example event, but other events may initiate the use of redundant computers/components as well, for example, intentionally taking a server offline to perform a repair or update, or any other event that causes a computer or component to become unavailable to the HA cluster. Therefore, when reference is made herein to a failure or failover, the description should be interpreted to include other events that may cause the computer/component to become unavailable.

FIG. 1 is a block diagram of an example HA cluster configuration 100 that may implement automatic cluster-based failover handling. HA cluster configuration 100 may include an HA cluster 102, a connectivity layer 104 and at least one host computing device (e.g., host 106, host 108, etc.). Each host computing device may be any computing device or computer component capable of accessing at least one HA cluster, for example, via a connectivity layer (e.g., 104). Host devices (e.g., 106, 108) may each include at least one host bus adapter (HBA) (see reference numbers 107 and 109), otherwise referred to as a "host adaptor" or "initiator." An HBA may be used by a host to connect to another system (e.g., to an HA cluster or a connectivity layer). An HBA may facilitate communication between the host and computers or components of an HA cluster. More details regarding host devices may be described below, for example, with regard to host device 208 of FIGS. 2A and 2B.

Connectivity layer 104 may include at least one switch, expander, router or the like. Connectivity layer 104 may route traffic or information packets between a host (e.g., host 106 or 108) and any computer or component (e.g., node 120 or node 124) of HA cluster 102. The HBA(s) in hosts 106, 108 and/or connectivity layer 104 may utilize a communication protocol, for example, a non-fibre communication protocol such as SAS or the like.

HA cluster 102 may include a number of nodes (e.g., 120, 124, etc.) that provide services such as applications and/or storage. Each node may be any computing device or computer component capable of accessing at least one host, for example, via a connectivity layer (e.g., 104). In alternate embodiments, two or more nodes maybe included in the same computing device or two or more computing devices may be included in a single node. In one example configuration, each of nodes 120, 124 may access a number of storage devices (e.g., hard drives) to provide access to the storage devices to at least one host device (e.g., 106, 108).

HA cluster 102 may provide redundancy by offering identical services (e.g., applications and/or storage) via multiple nodes. For example, each of nodes 120, 124 may access storage devices that store identical data. Specifically, node 120 may access storage device(s) that store a first copy of certain data, and node 124 may access storage device(s) that store a second copy of certain data. If either of node 120 or node 124 were to fail, a host device (e.g., 106) may be able to access a copy of the data (either the first copy or the second copy). It should be understood that although the preceding example describes a HA cluster with redundant storage access, it should be understood that the solutions described in this disclosure may apply to HA clusters that provide redundant access to other services, such as applications.

HA cluster 102 may include a node communication hub 128, which may facilitate communication between various nodes (e.g., 120, 124, etc.) included in HA cluster 102. Node communication hub 128 may be implemented as any type of communication fabric, communication bus or communication circuitry that allows for the passage of signals, data and/or messages between the various nodes of HA cluster 102.

Each node (e.g., nodes 120, 124) may include a port connectivity control module (e.g., 122, 126). Each of these port connectivity control modules may include a series of instructions encoded on a machine-readable storage medium and executable by a processor of each respective node (e.g., 120, 124). More details regarding a machine-readable storage medium and a processor included in one example implementation of a node computing device may be described below with regard to FIG. 4. In addition or as an alternative, each port connectivity control module may include one or more hardware devices including electronic circuitry for implementing the functionality described below. With respect to the modules described and shown herein, it should be understood that part or all of the executable instructions and/or electronic circuitry included within one module may, in alternate embodiments, be included in a different module shown in the figures or in a different module not shown.

The port connectivity control modules (e.g., 122, 126) of the various nodes may work together to provide a cluster-based failover solution that may not require a host to implement a failover software solution. The cluster-based failover solution may work with various non-fibre channel communication links/protocols (e.g., SAS) used by connectivity layer 104 and/or hosts 106, 108. The failover solution may not require any changes to connectivity layer 104, meaning, for example, that connectivity layer 104 may provide the functionality offered by current SAS switches and expanders. More details regarding the functionality of at least one example connectivity control module may be described below.

The following will describe the concept of port virtualization, including how connectivity layer 104 may introduce port virtualization into the HA cluster configuration 100, and how the port connectivity control modules (e.g., 122, 126) may take advantage of the port virtualization to provide a cluster-based failover solution. The term "port virtualization" may refer to the emulation of physical ports (e.g., serial ports). Various communication protocols/standards (e.g., SAS) may define port identifiers or port addresses (e.g., "SAS Address") that may be used to locate and track services (e.g., storage or applications) that are physically attached (e.g., via physical ports) to the HA cluster. Each physical port in the cluster (e.g., physical ports on node computing devices 120, 124) may be associated with a port address. The port connectivity control module in a particular node may be able to assign port addresses to the various physical ports in the node. The connectivity layer 104 may allow for several physical ports to be connected to a single HBA in a host. Therefore, instead of the HBA being directly connected to a single port via a cable, the connectivity layer determines all the port addresses that are available and presents them to the HBA.

The port connectivity control modules (e.g., 122, 126) may take advantage of the way that the connectivity layer 104 presents available port addresses to the host. For example, if one physical port in the cluster (with a port address) were inactivated, and a second physical port in the cluster were activated and assigned with the same port address as the inactivated port, the connectivity layer 104 would still present the same port address as being available to the host. In this respect, a physical port swap could be performed in the cluster without the host detecting any changes in the set of port addresses available. In this scenario, the host would not need to use failover software to swap ports if one physical port in the cluster went down and another physical port was activated with the same port address. Additionally, the connectivity layer 104, under normal operation, would still route packets from the host to the same port address even though the physical port may have changed. Therefore, failed, inactive or offline components (e.g., nodes) of a HA cluster will not appear as any disruption of service to a host. Additionally, the solutions provided in this disclosure may be compatible with existing connectivity hardware (e.g., switches, expanders, routers, etc.), existing HBA drivers and even existing failover software. Additionally, an HA cluster configuration that utilizes a particular communication protocol/standard (e.g., SAS, SAS-3, SPL-2, etc.) may continue to utilize the same protocol/standard.

Figure 2A:
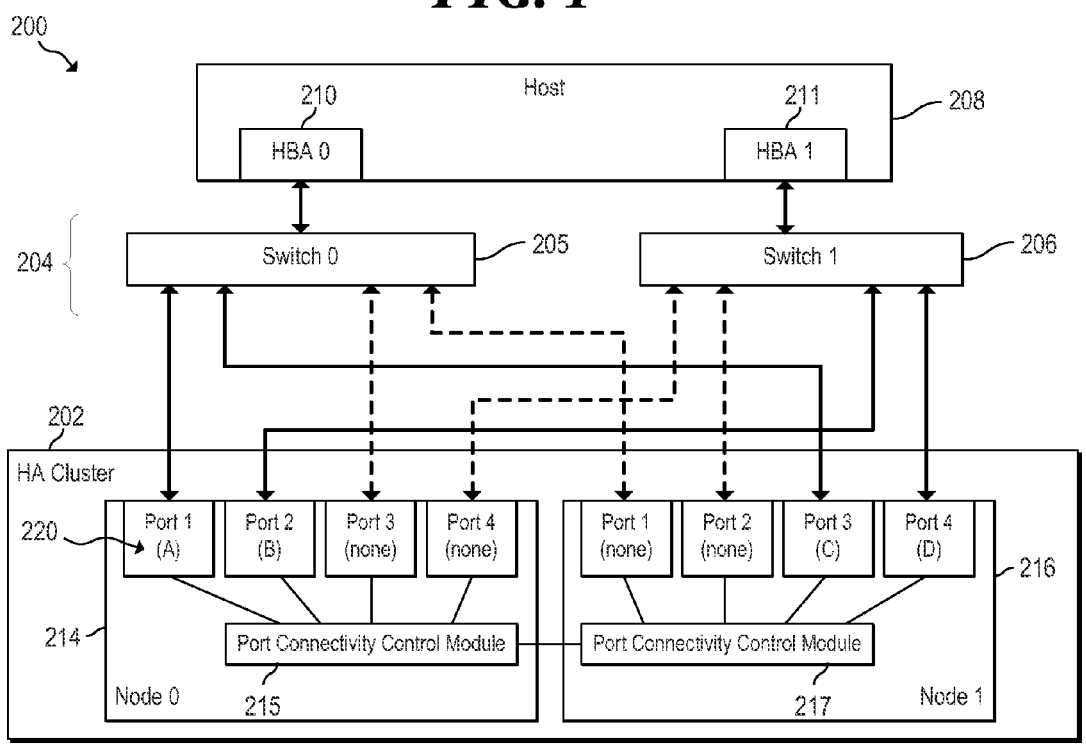
FIG. 2A is a block diagram of an example HA cluster configuration that may implement automatic cluster-based failover handling.

FIG. 2A is a block diagram of an example HA cluster configuration 200 that may implement automatic cluster-based failover handling. HA cluster configuration 200 may be similar to HA cluster configuration 100, for example. In the particular embodiment of FIG. 2, HA cluster configuration 200 may include an HA cluster 202, a connectivity layer 204 (including two switches 205, 206) and a host computing device 208. Host device 208 may be similar to one of host devices 106, 108, for example. Host device 208 may include two host bus adapters (HBAs) 210 and 211, where each HBA may facilitate communication between host 208 and one of the switches 205, 206. Connectivity layer 204 may be similar to connectivity layer 104 of FIG. 1, for example. In the embodiment of FIG. 2A, connectivity layer 104 includes two switches 205 and 206, where each switch connects to a different HBA (210, 211) of host 208. Each switch may provide access to a number of physical ports (e.g., two physical ports) of each node 214, 216. It should be understood that although the term "switch" is used to refer to components 205 and 206, these components may actually include more functionality than a simple switch. For example, switches 205, 206 may include at least one expander, router, or any other component to route packets, data, messages and the like from a HBA to multiple ports associated with an HA cluster.

It should be understood that although the HA cluster configuration 200 of FIG. 2A is depicted with certain numbers of various components (e.g., one host, two HBAs per host, two switches, two nodes, four ports per node, etc.), the solutions described in the present disclosure may be used with various other configurations. In one example alternate configuration, host 208 may include or use a single HBA to connect to the connectivity layer 204. Then, connectivity layer 204 may include a single component instead of two switches. In this example, connectivity layer 204 may be more complex to facilitate the routing of packets, data, message and the like to more ports than single switches 205, 206. In another example alternate configuration, HA cluster 202 may include more than two nodes. In this example, connectivity layer 204 may be more complex to facilitate the routing of packets, data, messages and the like to more nodes and ports than does the depicted connectivity layer 204. Therefore, it should be understood that the descriptions of the various configurations provided herein are intended to describe the concept of cluster-based failover handling, without limiting the concept to the particular configurations depicted.

In the embodiment of FIG. 2A, HA cluster 202 includes two nodes 214, 216. Each node includes 4 physical ports (e.g., Port 1, 2, 3, 4). Each physical port may be associated with a port address. In FIG. 2A, the port address for each physical port is shown in parenthesis. As one example, the port address (shown generally by reference number 220) for Port 1 of node 214 is "A". As another example, the port address for Port 3 of node 214 is "none" (e.g., the port is idle, inactive, down, failed, etc.). It should be understood that the port addresses used in the example of FIG. 2A are just for illustrative purposes, and port addresses actually may be more complex (e.g., a series of letters, numbers, etc.). The port addresses of the various ports may be assigned by the port connectivity control module (e.g., 215, 217) of the respective node. Additionally, an idle, inactive, down or failed port may actually have a port address with a different label (e.g., "inactive") or may have a particular code (e.g., a series of letters, numbers, etc.). Or, the physical port of an inactive port may be turned off, in which case the physical port may report no information (and no port address). Idle, inactive, down or failed ports may appear to the connectivity layer 204 (e.g., switches 205, 206) to be unconnected.

In some embodiments, each node (e.g., node 214, 216) of HA cluster 202 may access services (e.g., storage or applications) that are redundant or duplicative of services accessed by the other node. For example, node 214 may access a number of storage devices (e.g., hard drives) that store data, and node 216 may access a number of storage devices that store a copy of the same data. In this respect, if a component of one node (or the entire node) fails, the other node may provide the services that were previously provided by the failing component. In some embodiments, each node may reserve a subset (e.g., half) of its physical ports to accommodate failover. For example, as shown in FIG. 2A, nodes 214, 216 may be currently reserving any ports with a port address of "none" (e.g., Port 1 of node 216). Reserved ports may be set as idle, down or non-functional, and then later (e.g. as a result of a failure) may be activated or brought up.

Figure 2B:
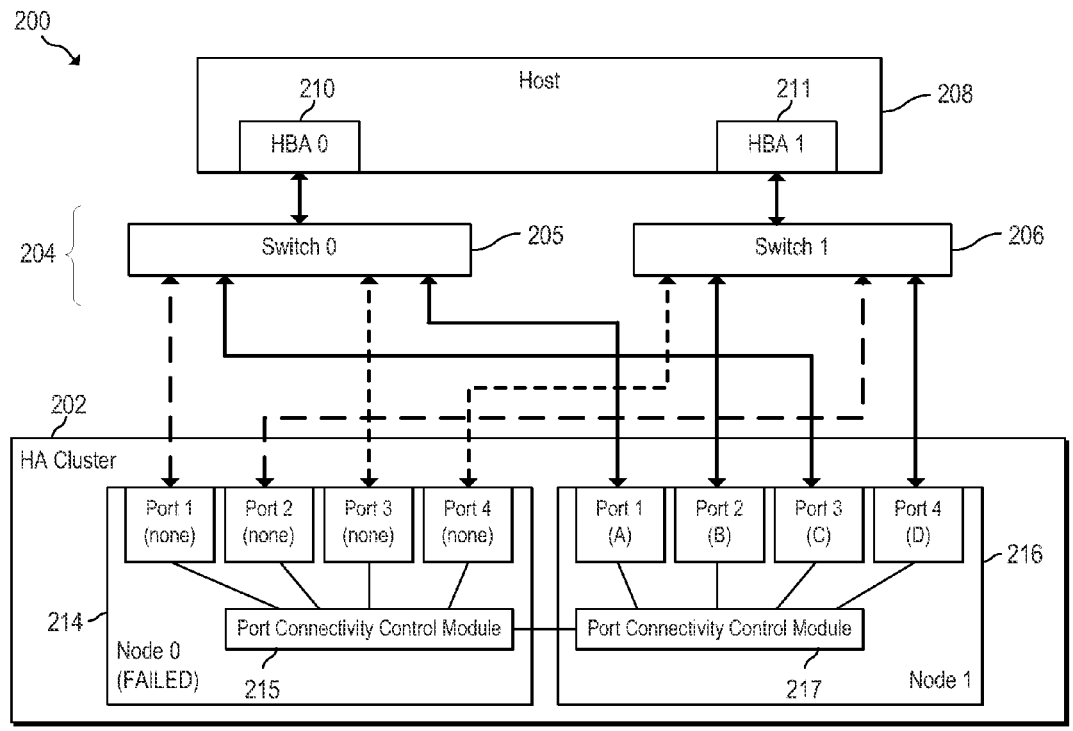
FIG. 2B is a block diagram of an example HA cluster configuration that may implement automatic cluster-based failover handling.

FIGS. 2A and 2B may be used in conjunction to explain one example failover scenario. The following scenario may describe how one node may accommodate the failure of another node by using (and reassigning) its reserved physical ports. The port connectivity control modules (e.g., 215, 217) may play a role in causing the failover handling described below. The port connectivity control modules may be described in more detail below with respect to FIG. 3. In the scenario of FIGS. 2A and 2B, FIG. 2A shows a HA cluster configuration 200 before a node failure, and FIG. 2B shows a HA cluster configuration 200 after a node failure (e.g., node 214). As can be seen in FIG. 2A, Port 1 and Port 2 of node 214 are active and have been assigned (e.g., by module 215) with port address A and B respectively. Port 2 and Port 3 of node 214 are inactive (with port address "none"). Similarly, Port 3 and Port 4 of node 216 are active and have been assigned (e.g., by module 217) with port address C and D respectively. Port 1 and Port 2 of node 216 are inactive (with port address "none"). With this port configuration, host 208 may recognize four different port addresses (A, B, C, and D). Host 208 may have access to cluster services via four active ports, two active ports in node 214 and two in node 216. However, if one node were to fail (e.g., without the failover solution described herein), host 208 would lose access via two ports (the ports in the failing node). This may cause host to experience lower bandwidth to the services of HA cluster 202 and/or host may lose access to any services that are only accessible via the failing node.

FIG. 2B depicts an example failover solution that may be automatically implemented upon failover. As can be seen in FIG. 2B, node 214 has failed (or has been taken offline for maintenance or is otherwise unavailable). Node 214 may detect its own failure and notify port connectivity control module of node 215. Port connectivity control module 215 may deactivate the active ports of node 214 (e.g., Port 1 and Port 2), as shown in FIG. 2B. Port connectivity control module 215 may then communicate (e.g., via a node communication hub such as 128 of FIG. 1) with port connectivity control module 217 in node 216. Module 215 may indicate to module 217 that node 214 has failed. Module 215 may indicate to module 217 the number of ports that module 215 deactivated, and may indicate the port addresses that were assigned to the ports (e.g., before they were deactivated).

Port connectivity control module 217 may then activate one reserved port in node 216 for every port that was deactivated in node 214. For example, module 217 may activate Port 1 and Port 2 of node 216. Module 217 may assign the activated ports with the same port addresses that were associated with the deactivated ports in node 214. For example, Port 1 in node 216 may be assigned with port address "A" (the port address from Port 1 in node 214). Likewise, Port 2 in node 216 may be assigned with port address "B" (the port address from Port 2 in node 214). At this point, the same set of port addresses (e.g., A, B, C, D) may still be available to host 208 as was available before node 214 failed; however node 216 has now assumed the role of presenting SAS addresses A and B instead of node 214. Thus, from host 208's perspective, the connectivity to the HA cluster is unchanged. The discovery action of host 208's HBAs will find that the same port addresses are present after the node failure as before. From the connectivity layer 204's perspective, port addresses A and B have moved to different physical ports, but are present as they were before. Connectivity layer 204 will detect the same number of active ports and the same port addresses.

The following describes one example reason of how the failover solution of the present disclosure may work with non-fibre protocols (e.g., SAS), and why the failover solutions for fibre protocols may not work with other protocols. Because some protocols like SAS do not maintain a database of entities that are connected to the network (as does fibre channel), hosts that are part of an SAS network, for example, remain ignorant of precisely which physical devices they are sending packets to or receiving packets from. The failover solution described herein utilizes this host ignorance to present the same set of port addresses to the host post-failure. The host may recognize the same port addresses (e.g., A, B, C, and D) as before the failure, even though the physical ports may have changed.

Figure 3:
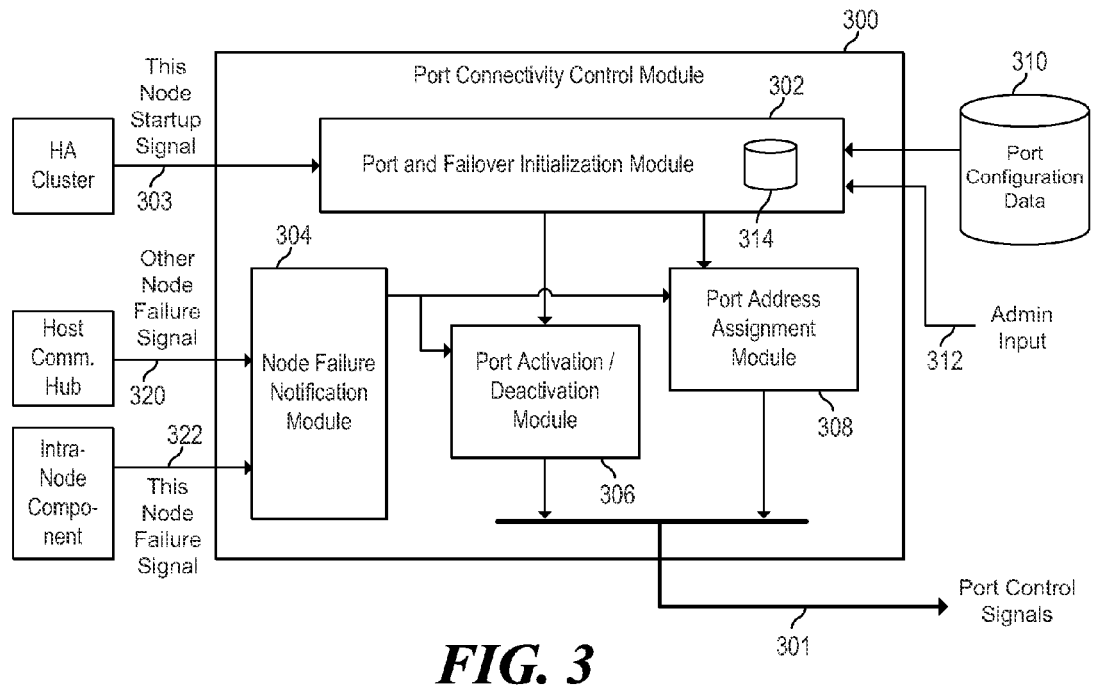
FIG. 3 is a block diagram of an example port connectivity control module 300 that may be used to implement automatic cluster-based failover handling.

FIG. 3 is a block diagram of an example port connectivity control module 300 that may be used to implement automatic cluster-based failover handling. Port connectivity control module 300 may be similar to port connectivity control modules 215 and/or 217 of FIGS. 2A, 2B. Port connectivity control module 300 may be in communication (e.g., via connection 301) with a number of ports of a node (e.g., Ports 1, 2, 3, 4 of node 216). In some embodiments, port connectivity module 300 may serve as the main port driver in a node (e.g., an SAS driver, etc.). In other embodiments, port connectivity module 300 may be an additional module and may communicate with an existing port driver. It should be understood that part or all of the executable instructions, electronic circuitry and/or functionality included within a port connectivity control module as shown in FIG. 3 may, in alternate embodiments, be incorporated into or be in communication with a main port driver. Port connectivity control module 300 may include a number of sub modules (e.g., modules 302, 304, 306 and 308). With respect to these sub modules, it should be understood that part or all of the executable instructions, electronic circuitry and/or functionality included within one sub module may, in alternate embodiments, be included in a different sub module shown in the figures or in a different sub module not shown.

Port and failover initialization module 302 may receive a node startup signal 303 that indicates that this node is being started up or initialized. The term "this node" may refer to the node computing device that includes the port connectivity control module being referred to, as opposed to other node(s) within the HA cluster. The node startup signal may be generated based on a broader startup signal for the entire HA cluster. Port and failover initialization module 302 may determine which ports should be active and which ports should be inactive or reserved when the node starts up or initializes. Port and failover initialization module 302 may determine which ports should be activated or inactivated in the case of a failure. Port and failover initialization module 302 may access port configuration data, for example, from repository 310. Repository 310 may be a non-volatile storage medium. Port configuration data may provide information about the ports of the particular node, for example, the number of physical ports in the node and how to communication information to the physical ports.

Port and failover initialization module 302 may receive input 312 from an administrator (or simply admin), for example, via a user interface. Input 312 may specify configuration information that may be stored in repository 314, for example, such that port and failover initialization module may use the configuration information (e.g., upon startup of the node or failure of a node). Repository 314 may be a non-volatile storage medium. Configuration information (e.g., in repository 314) may indicate various settings such as which ports should be set as active when the node starts up, and which ports should be inactive or reserved when the node starts up. Configuration information may also indicate whether the failover feature of the present disclosure should be enabled at all. If the failover solution is disabled, port connectivity module 300 may be disabled and a main port driver may operate as normal to control the ports. Alternatively, the functionality that implements the failover features described herein may be disabled and the rest of the port connectivity module or port driver may operate without such features. For example, if the failover features were disabled, all the ports of the node may be activated upon startup of the node (e.g., without reserving any ports for failover handling).

Node failure notification module 304 may determine when other node(s) in the HA cluster fail (or are taken offline or otherwise become unavailable). Node failure notification module 304 may receive a failure signal 320 from another node, for example, via a host communication hub, such as 128. Failure signal 320 may indicate the number of physical ports that are associated with the failure, and may indicate the port addresses that are associated with the physical ports. Node failure notification module 304 may determine when this node fails (or is taken offline or otherwise becomes unavailable). Node failure notification module 304 may receive a failure signal 322 from an intra-node component that detects such node failure. When either this node or another node fails, node failure notification module 304 may detect such failure and indicate the failure (e.g. number of ports and associated port addresses) to port activation/deactivation module 306 and port address assignment module 308.

In some embodiments, when this node fails, port connectivity control module 300 may indicate (e.g., via node failure notification module 304) the failure to other nodes in the HA cluster. Node failure notification module 304 may, for example, may send a failure signal to at least one other node, for example, via a host communication hub, such as 128. The failure signal may indicate the number of physical ports in this node or the number of physical ports associated with the failure. The failure signal may indicate the port addresses that are associated with the failing physical ports. In some embodiments, another intra-node component may indicate a failure of this node to other nodes, instead of the port connectivity control module. Whether the failure signal comes from the port connectivity control module 300 or another intra-node component, other port connectivity control modules of other nodes in the HA cluster may use the failure signal in a similar manner to the way signal 320 is used in FIG. 3.

Port activation/deactivation module 306 may activate/deactivate ports upon startup of the node and/or when a failure occurs. Port activation/deactivation module 306 may receive an indication from port and failover initialization module 302 that indicates that the node has started up or been initialized. Port activation/deactivation module 306 may receive an indication from node failure notification module 304 that either this node or another node has failed (e.g., and the number of failed ports). Port activation/deactivation module 306 may receive information from port and failover initialization module 302 regarding which ports should be activated/deactivate at startup and/or in the case of a failure, and perhaps information regarding how to communicate with such ports. Port activation/deactivation module 306 may communicate (e.g., via connection 301) with the ports to activate or turn on appropriate ports, e.g., at startup or in the case of a failure by another node. In some situations, if the entire node is being shut down or taken off line, it may not be necessary to shut down individual ports.

Port address assignment module 308 may assign port addresses to ports upon startup of the node and/or when a failure occurs. Port address assignment module 308 may receive an indication from port and failover initialization module 302 that indicates that the node has started up or been initialized. Port address assignment module 308 may receive an indication from node failure notification module 304 that either this node or another node has failed (e.g., and the port addresses associated with failing ports). Port address assignment module 308 may receive information from port and failover initialization module 302 regarding which ports should be activated/deactivate at startup and/or in the case of a failure, and perhaps information regarding how to communicate with such ports. Port address assignment module 308 may communicate (e.g., via connection 301) with the ports to assign port addresses to ports, e.g., at startup or in the case of a failure by this node or another node. In some situations, if the entire node is being shut down or taken off line, it may not be necessary to assign any port address (e.g., "none") to the ports.

In some situations, the port address assignment module 308 may send port addresses to inactive or reserved ports before a failure. For example, such that when a failure is detected, the reserved ports need only be activated or turned on. In these situations, the port addresses associated with the reserved ports may be determined at initialization of the node. Port address assignment module 308 may receive the port address assignments for the reserved ports from the port and failover initialization module 302. The port and failover initialization module may receive the port address assignments for the reserved ports from admin input (e.g., 312), where an admin may configure this node and other nodes in the HA cluster such that active port addresses in other nodes match the port addresses for reserved ports in this node.

Figure 4:
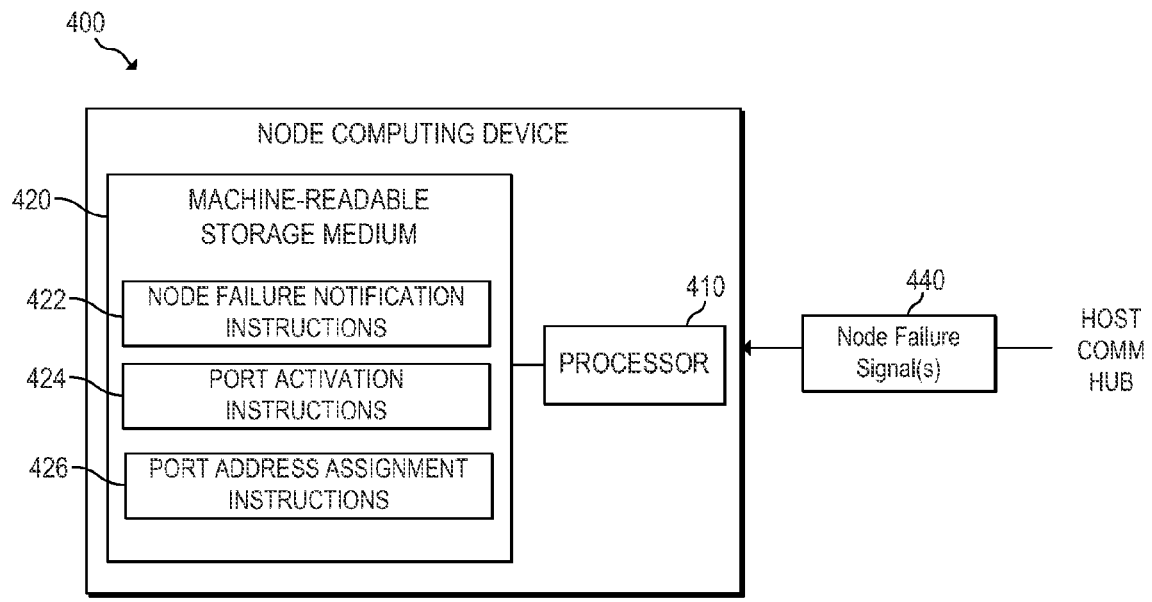
FIG. 4 is a block diagram of an example node computing device for automatic cluster-based failover handling.

FIG. 4 is a block diagram of an example node computing device 400 for automatic cluster-based failover handling. Node computing device 400 may be any computing device or computer component capable of accessing at least one HA cluster (e.g., 102 of FIG. 1), for example, via a connectivity layer (e.g., 104). Node computing device 400 may be in communication with the connectivity layer and with the HA cluster according to a standard or protocol, for example, SAS. More details regarding an example node computing device may be described herein, for example, with respect to node computing device 120 or 124 of FIG. 1 or node computing device 214 or 216 of FIG. 2. In the embodiment of FIG. 4, node computing device 400 includes a processor 410 and a machine-readable storage medium 420.

Processor 410 may be one or more central processing units (CPUs), microprocessors, and/or other hardware devices suitable for retrieval and execution of instructions stored in machine-readable storage medium 420. Processor 410 may fetch, decode, and execute instructions 422, 424, 426 to, among other things, perform automatic cluster-based failover handling. As an alternative or in addition to retrieving and executing instructions, processor 410 may include one or more electronic circuits comprising a number of electronic components for performing the functionality of one or more of instructions 422, 424, 426. With respect to the executable instruction representations (e.g., boxes) shown in FIG. 4, it should be understood that part or all of the executable instructions and/or electronic circuits included within one box may, in alternate embodiments, be included in a different box shown in the figures or in a different box not shown.

Machine-readable storage medium 420 may be any electronic, magnetic, optical, or other physical storage device that stores executable instructions. Thus, machine-readable storage medium 420 may be, for example, Random Access Memory (RAM), an Electrically-Erasable Programmable Read-Only Memory (EEPROM), a storage drive, an optical disc, and the like. Machine-readable storage medium 420 may be disposed within node computing device 400, as shown in FIG. 4. In this situation, the executable instructions may be "installed" on the device 400. Alternatively, machine-readable storage medium 420 may be a portable (e.g., external) storage medium, for example, that allows node computing device 400 to remotely execute the instructions or download the instructions from the storage medium. In this situation, the executable instructions may be part of an installation package. As described in detail below, machine-readable storage medium 420 may be encoded with executable instructions for automatic cluster-based failover handling.

Node failure notification instructions 422 may determine when this node and/or other node(s) in the HA cluster fail (or are taken offline or otherwise become unavailable). Node failure notification instructions 422 may receive at least one node failure signal 440 from other node computing devices (e.g., via a host communication hub). Node failure notification instructions 422 (or some other module or instructions included in node computing device 400) may generate at least one node failure signal (also generally indicated by reference number 440) and may send the node failure signal to at least one other node computing device (e.g., via a host communication hub).

Port activation instructions 424 may activate ports when a failure occurs. Port activation instructions 424 may receive an indication from node failure notification instructions 422 that another node has failed. Port activation instructions 424 may communicate with the ports to activate appropriate ports in the case of a failure by another node. Port address assignment instructions 426 may assign or reassign port addresses to ports when a failure occurs. Port address assignment instructions 426 may receive an indication from node failure notification instructions 422 that either this node or another node has failed. Port address assignment instructions 426 may communicate with the ports to assign or reassign port addresses to ports in the case of a failure by another node.

Figure 5:
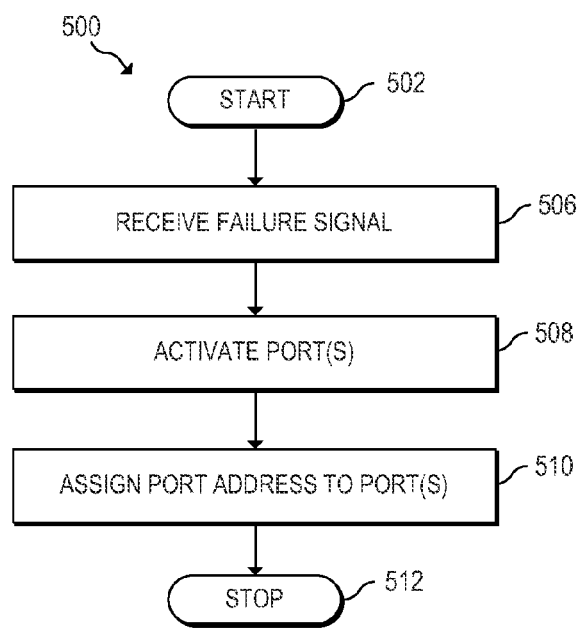
FIG. 5 is a flowchart of an example method for automatic cluster-based failover handling.

FIG. 5 is a flowchart of an example method 500 for automatic cluster-based failover handling. Method 500 may be executed by a node computing device that may be similar to node computing device 400 of FIG. 4. Other suitable computing devices may be used as well, for example, computing devices 120, 124 of FIG. 1, or node computing devices 214, 216 of FIGS. 2A and 2B. Method 500 may be implemented in the form of executable instructions stored on a machine-readable storage medium (in each respective node computing device), such as storage medium 420, and/or in the form of electronic circuitry. In alternate embodiments of the present disclosure, one or more blocks of method 500 may be executed substantially concurrently or in a different order than shown in FIG. 5. In alternate embodiments of the present disclosure, method 500 may include more or less blocks than are shown in FIG. 5. In some embodiments, one or more of the blocks of method 500 may, at certain times, be ongoing and/or may repeat.

Method 500 may start at block 502 and continue to block 506, where a first node computing device (e.g., similar to 400) of a HA cluster may receive (e.g., via instructions 422) a failure signal 440. A second node computing device (e.g., similar to 400) of the HA cluster may have generated the failure signal, for example, in response to detecting that the second node has failed. At block 508, the first node may activate (e.g., via instructions 424) at least one port to handle the failure of the second node. Also, the second node may deactivate at least one port. At block 510, the first node may assign or reassign (e.g., via instructions 426) a port address to each of the recently activated ports. The port addresses may be the same as the port addresses used by the ports in the second node, for example, prior to failure. Method 500 may eventually continue to block 512, where method 500 may stop.

Figure 6:
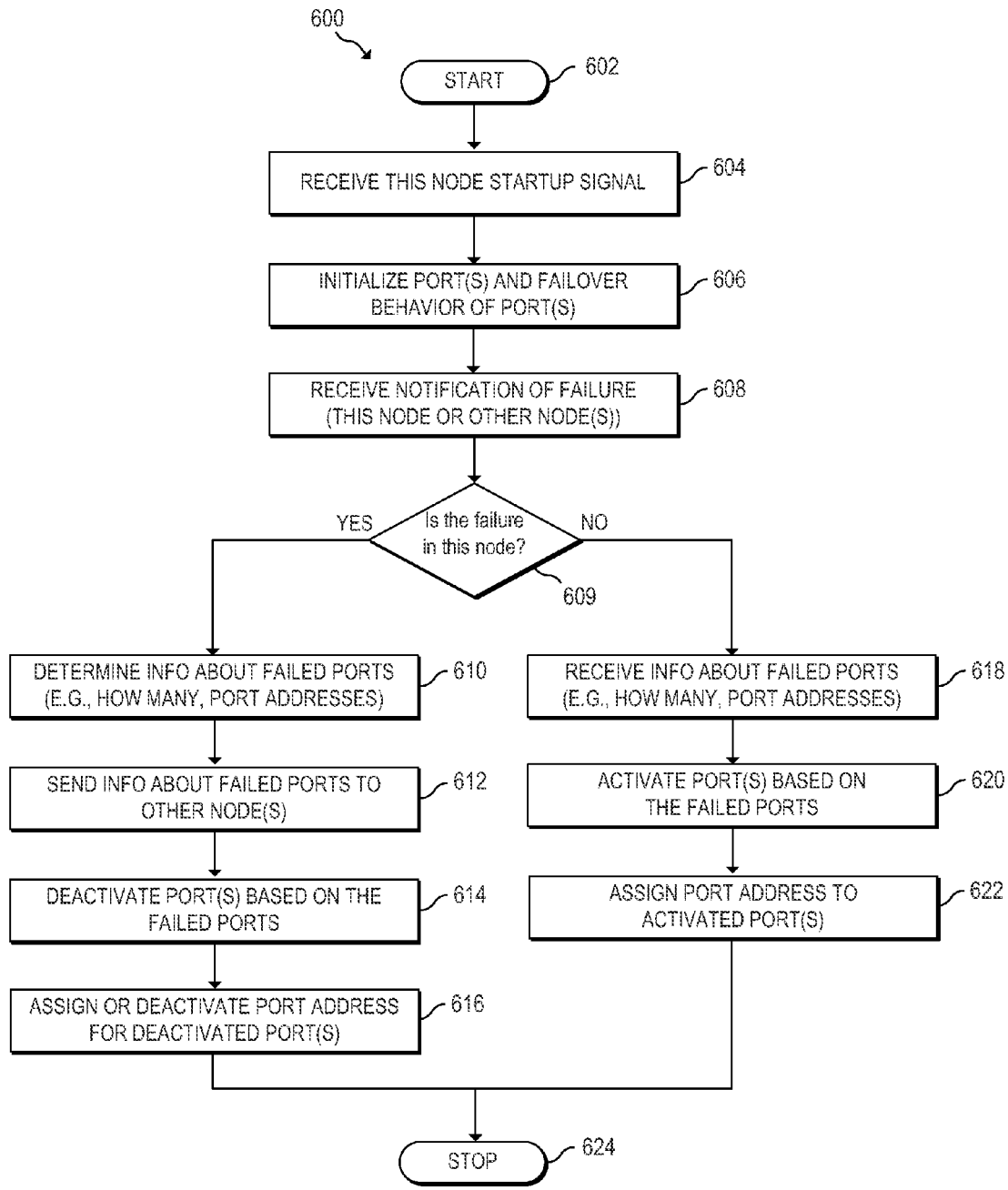
FIG. 6 is a flowchart of an example method for automatic cluster-based failover handling.

FIG. 6 is a flowchart of an example method 600 for automatic cluster-based failover handling. The execution of method 600 is described below with reference to a general node computing device, which may be similar to node computing device 120 or 124 of FIG. 1, or node computing device 214 or 216 of FIGS. 2A and 2B. Although execution of method 600 is described below with reference to port connectivity control module 300 of FIG. 3, part or all of method 600 may be executed in a different module of the containing node computing device. Method 600 may be implemented in the form of executable instructions stored on a machine-readable storage medium, such as storage medium 420, and/or in the form of electronic circuitry. In alternate embodiments of the present disclosure, one or more blocks of method 600 may be executed substantially concurrently or in a different order than shown in FIG. 6. In alternate embodiments of the present disclosure, method 600 may include more or less blocks than are shown in FIG. 6. In some embodiments, one or more of the blocks of method 600 may, at certain times, be ongoing and/or may repeat.

Method 600 may start at block 602 and continue to block 604, where port connectivity control module 300 may receive a startup signal (e.g., signal 303) for this node. At block 606, port connectivity control module 300 may initialize (e.g., via module 302) at least one port and the failover behavior of the port(s). To initialize the port(s), port connectivity control module 300 may communicate (e.g., via modules 306, 308 and communication link 301) with the physical ports to activate or deactivate the port(s). At block 608, port connectivity control module 300 may receive a notification of a failure regarding this node (e.g., via signal 322) or at least one other node in the HA cluster (e.g., via signal 320). At block 609, port connectivity control module 300 may determine (e.g., via module 304) whether the failure is in this node or in another node. If the failure is in this node, method 600 may proceed to block 610. If the failure is in another node, method 600 may proceed to block 618.

At block 610, port connectivity control module 300 may determine information about the failed ports of this node, for example, how many ports are involved in the failure and the port addresses associated with these ports. At block 612, port connectivity control module 300 (or some other intra-node component) may send this port information to other nodes in the HA cluster, for example, such that these other nodes may perform failover handling. At block 614, port connectivity control module 300 may deactivate the ports in this node that are associated with the failure. To deactivate these port(s), port connectivity control module 300 may communicate (e.g., via module 306 and communication link 301) with the physical ports. At block 616, port connectivity control module 300 may deactivate or reassign the port addresses associated with failing ports in this node. To deactivate or reassign these port addresses, port connectivity control module 300 may communicate (e.g., via module 308 and communication link 301) with the physical ports. Method 600 may eventually continue to block 624, where method 600 may stop.

At block 618, port connectivity control module 300 may receive information about failed ports of other nodes, for example, how many ports are involved in the failure and the port addresses associated with these ports. At block 620, port connectivity control module 300 may activate the ports in this node that have been reserve to handle failures. To activate these port(s), port connectivity control module 300 may communicate (e.g., via module 306 and communication link 301) with the physical ports. At block 622, port connectivity control module 300 may reassign the port addresses associated with activated ports. To reassign these port addresses, port connectivity control module 300 may communicate (e.g., via module 308 and communication link 301) with the physical ports. Method 600 may eventually continue to block 624, where method 600 may stop.

The invention claimed is:

1. A high availability cluster for automatic cluster-based failover handling performed exclusively by a first port connectivity control module (PCCM) and a second PCCM, the high availability cluster comprising:
a first node having a number of first-node ports communicatively coupled to a host computing device via a connectivity layer and the first PCCM, the number of first-node ports including a first port that is active and associated with a first port address, the first node being a computing device and having a processor or circuitry to:
detect a failure associated with the first node and generate a failure signal indicating the failure; and
notify the first PCCM, wherein the first PCCM deactivates the first port that is active; and
a second node communicatively coupled to the first node, the second node having a number of second-node ports communicatively coupled to the host computing device via the connectivity layer and the second PCCM of the second node, the number of second-node ports including a second port that is inactive, the second node being a computing device and having a processor or circuitry to:
receive, via the second PCCM, the failure signal from the first PCCM of the first node,
based on the failure signal, activate, via the second PCCM, the second port, and
assign, via the second PCCM, the second port a port address that matches the first port address.

2. The high availability cluster of claim 1, wherein the failure signal indicates the port address of the first port.

3. The high availability cluster of claim 1, wherein the first-node ports and the second-node ports are locally coupled via at least one cable to the connectivity layer, and wherein the connectivity layer is locally coupled via at least one cable to the host computing device.

4. The high availability cluster of claim 1, wherein the first node and the second node each communicates, via the connectivity layer, with the host computing device according to a Serial Attached SCSI (SAS) protocol.

5. The high availability cluster of claim 1, wherein the first node and the second node each communicates, via the connectivity layer, with the host computing device according to a non-fibre channel protocol.

6. A method for execution exclusively by a first port connectivity control module (PCCM) and a second PCCM of a high availability cluster for automatic cluster-based failover handling, the method comprising:
receiving, by the first PCCM of a first node, a failure signal from the second PCCM of a second node, wherein the failure signal is generated by the second node of the high availability cluster in response to a failure related to the second node, wherein the second node notifies the second PCCM, and wherein the second PCCM deactivates a second port of the second node in response to the failure signal, the second port being associated with a second port address;
activating, by the first PCCM of the first node, a first port of the first node, wherein the first port was previously inactive before being activated; and
assigning, by the first PCCM of the first node, to the first port, a first port address that matches the second port address.

7. The method of claim 6, further comprising:
initializing the first node to specify that the first port should be inactive when the first node starts up, wherein the second node is initialized such that the second port is active when the second node starts up; and
starting up the first node, the first node being a computing device, thereby causing the first port to be inactive at startup, wherein the second node being a computing device is started up causing the second port to be active at startup.

8. The method of claim 7, further comprising initializing the first node with a setting that specifies that the first port should be activated when the first node receives the failure signal, wherein the activating of the first port includes accessing the setting.

9. The method of claim 6, wherein the failure signal indicates the port address of the second port.

10. The method of claim 6, wherein the first node and the second node each communicates via a connectivity layer, with a host computing device according to a Serial Attached SCSI (SAS) protocol.

11. A machine-readable storage medium encoded with instructions executable by a processor of a first port connectivity control module (PCCM) of a first node included in a high availability cluster for automatic cluster-based failover handling, wherein the automatic cluster-based failover handling is performed exclusively by the first PCCM and a second PCCM, the machine-readable storage medium comprising:
instructions to receive a failure signal from the second PCCM of a second node included in the high availability cluster, wherein the second node notifies the second PCCM of the second node and the second PCCM deactivates a second port of the second node in response to the failure signal, the second port being associated with a second port address;
instructions to activate a first port of the first node, wherein the first port was previously inactive before being activated; and
instructions to assign a first port address to the first port, wherein the first port address is the same as the second port address.

12. The machine-readable storage medium of claim 11, wherein the failure signal indicates a number of ports in the second node that are affected by the failure, and wherein the failure signal indicates the second port address.

13. The machine-readable storage medium of claim 12, wherein the first node and the second node each communicates, via a connectivity layer, with a host computing device according to a Serial Attached SCSI (SAS) protocol.

14. The machine-readable storage medium of claim 11, further comprising instructions to initialize the first node to cause the first port to be inactive when the first node starts up, and to cause the first port to be activated when the first node receives the failure signal.

* * * * *